United States Patent Office 2,696,296
Patented Dec. 7, 1954

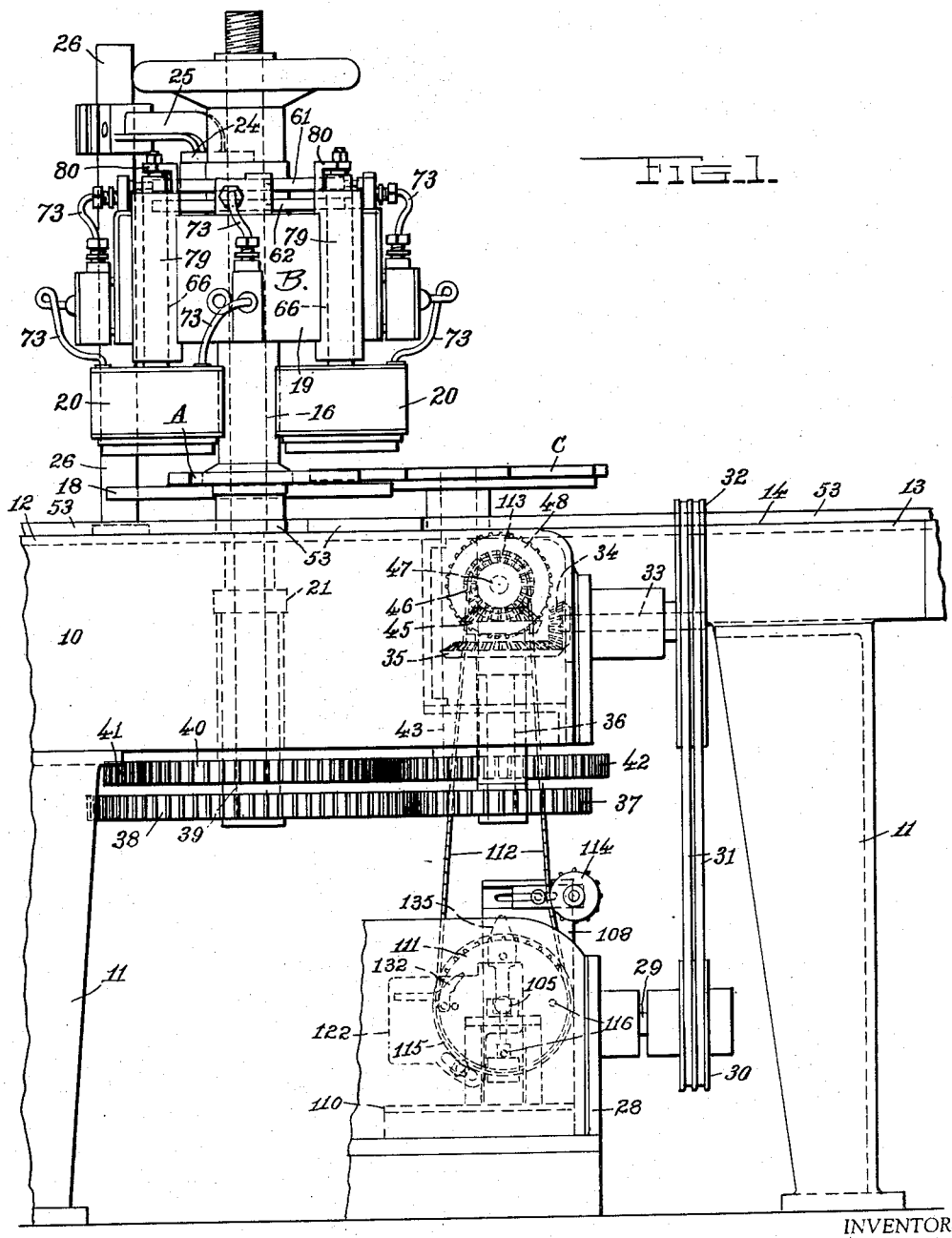

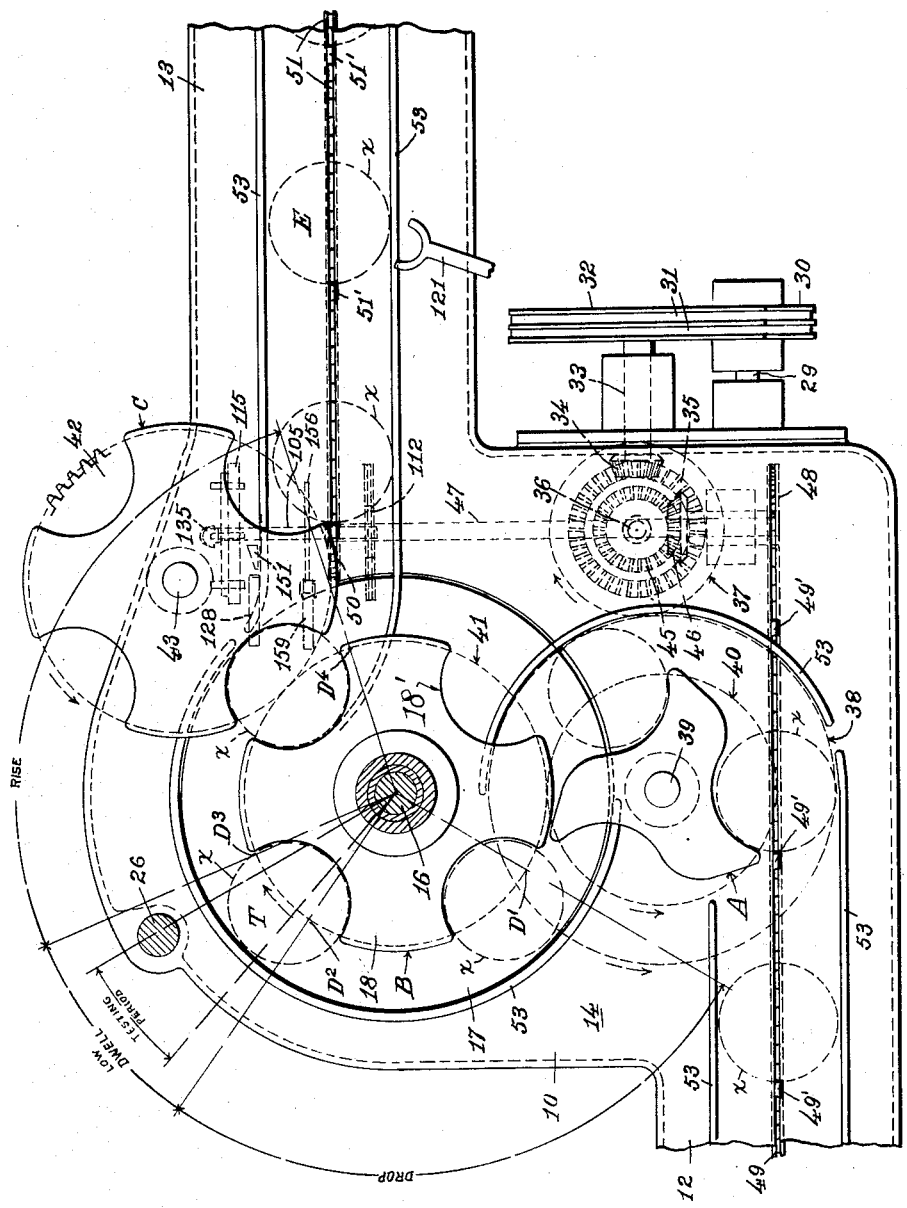

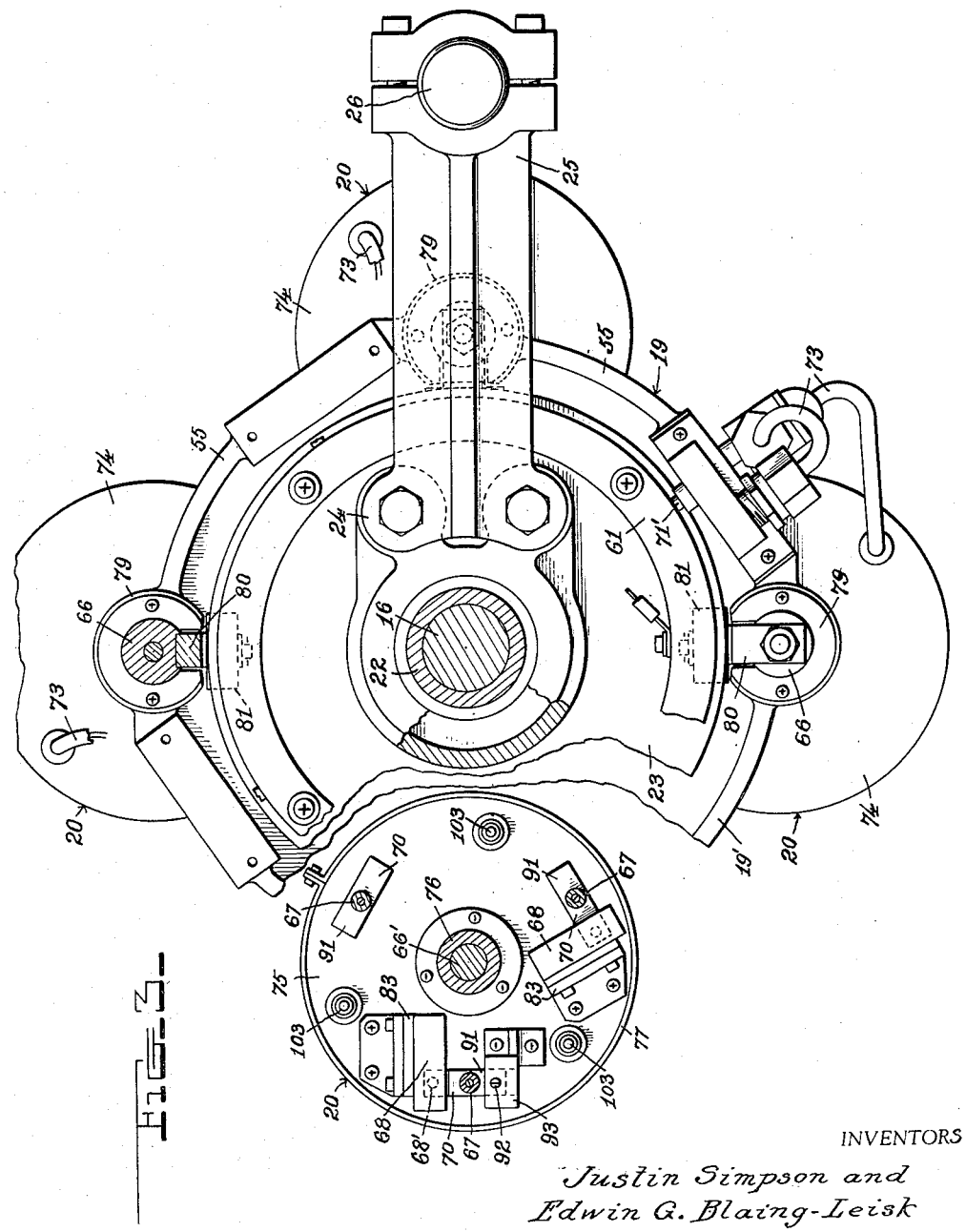

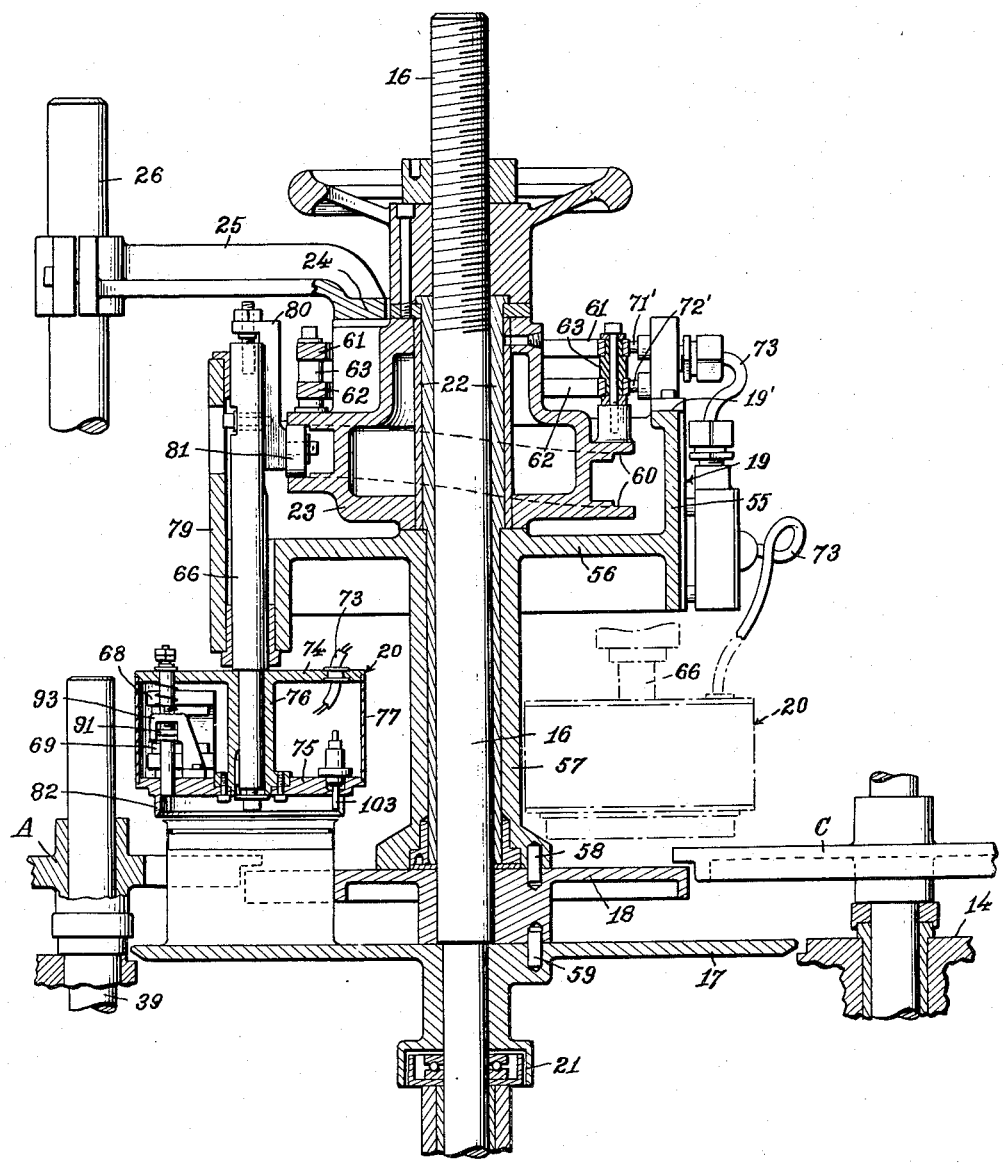

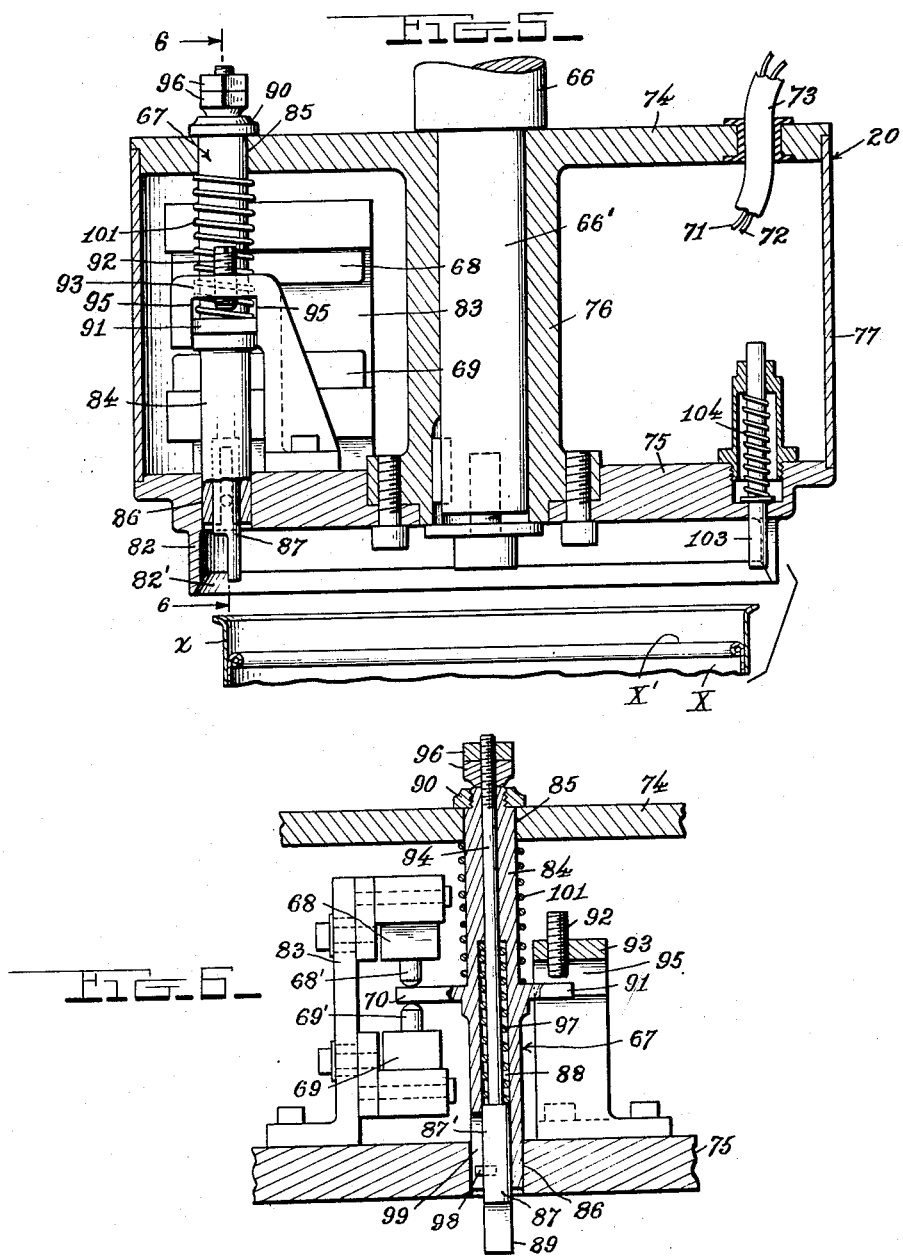

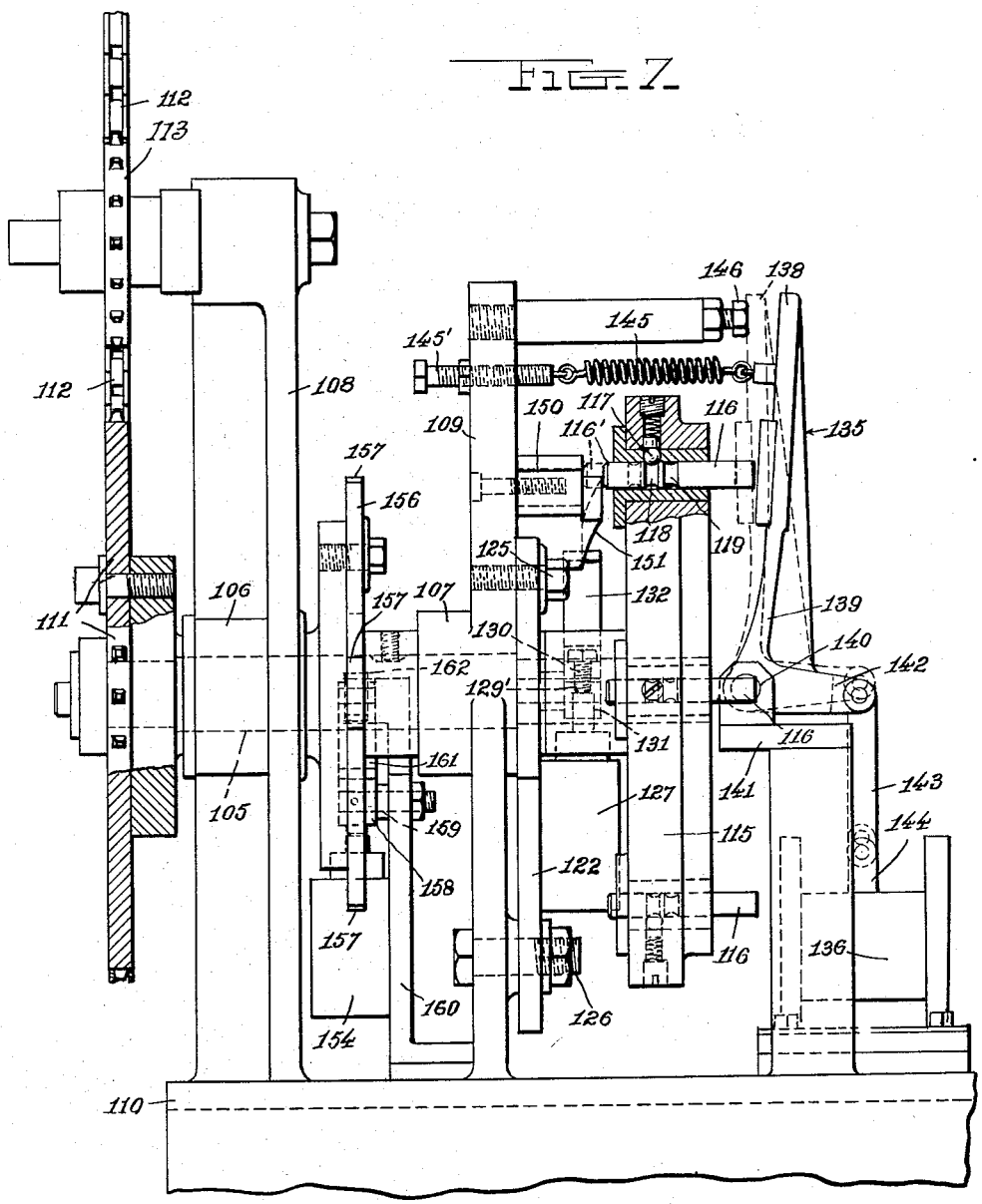

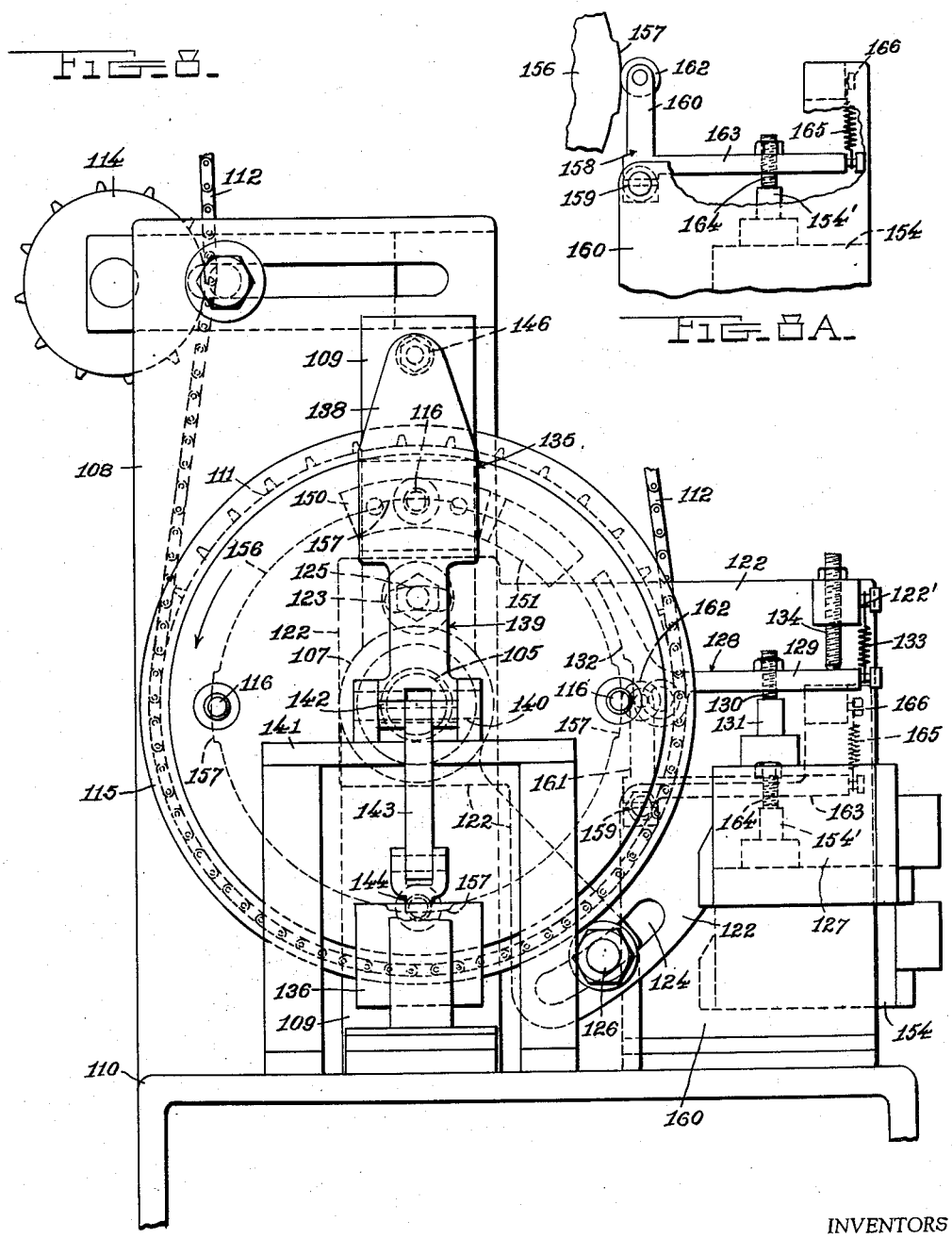

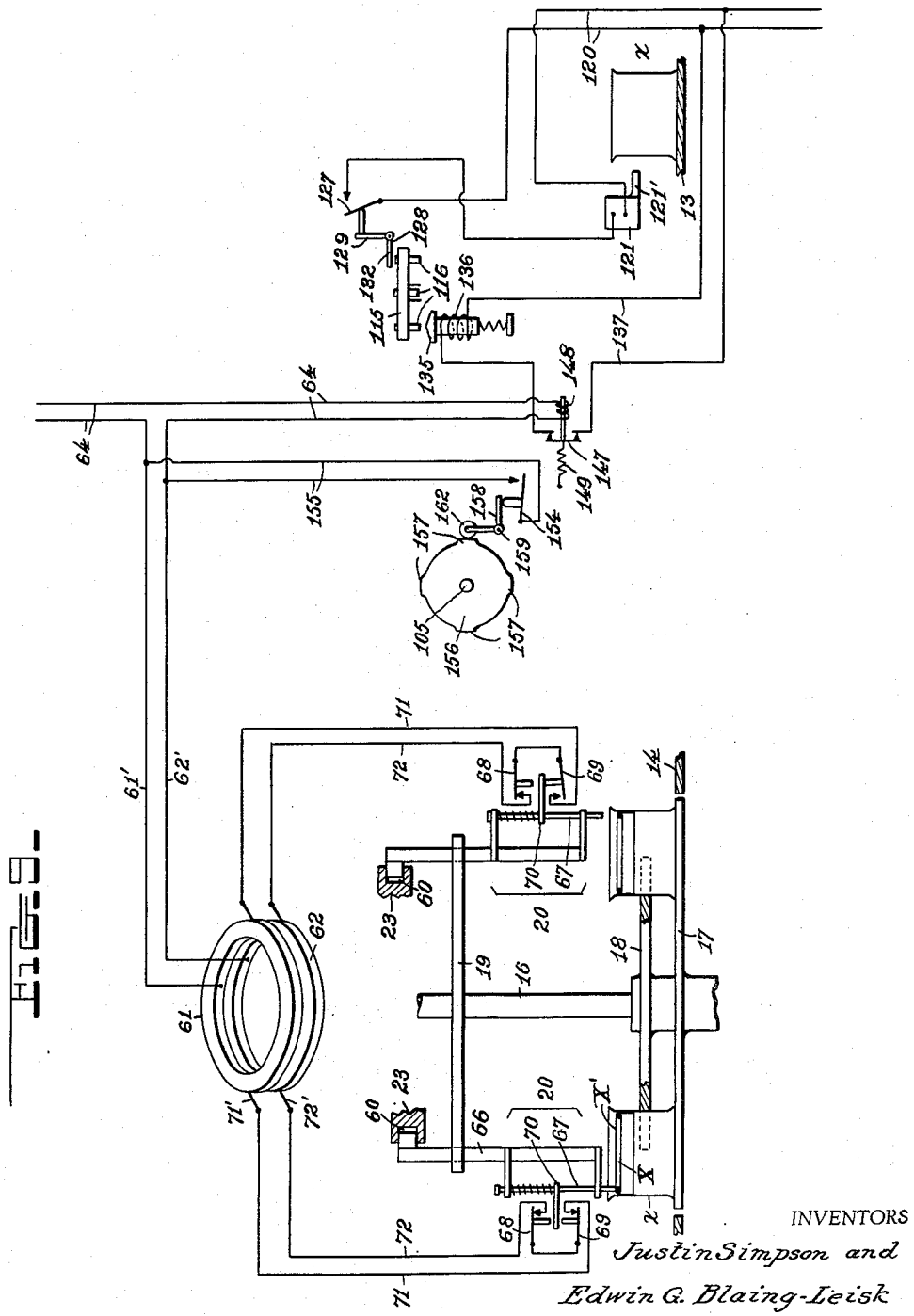

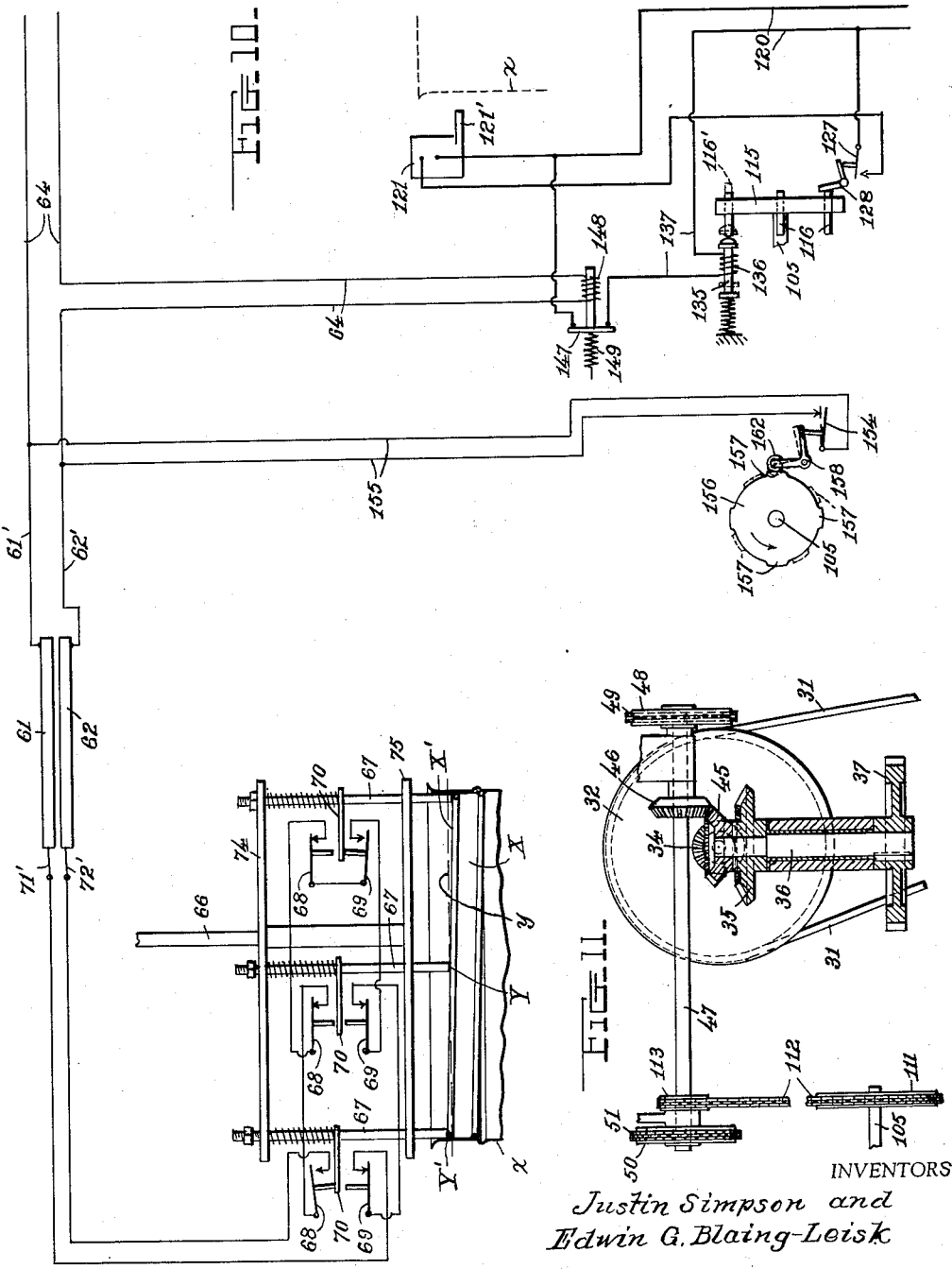

2,696,296

APPARATUS FOR TESTING AND REJECTING CAN BODIES DEVOID OF COLLARS OR HAVING COLLARS IMPROPERLY PLACED THEREIN

Justin Simpson, Elmhurst, and Edwin G. Blaing-Leisk, Chicago, Ill., assignors to Continental Can Company, Inc., New York, N. Y., a corporation of New York Application August 18, 1953, Serial No. 374,846

15 Claims. (Cl. 209—82)

This invention relates to apparatus for testing can bodies for misplaced or absent collars, and for ejecting the defective cans from a procession of tested cans.

Cans of the type under consideration are those having a tear strip adapted to be wound about a key and thus torn from the can to separate the upper extremity of the can body and attached end or closure from the main body portion of the can, thereby to effect an opening of the can.

It is customary to provide a collar within and extending from the upper extremity of the can body left by tearing out the tear strip so as to provide an upward extension on which the skirt depending from the removed top closure of the can may be telescoped in order to effect a reclosing of the can.

In the process of manufacturing cans of the type mentioned, the collar is inserted in the body of the can after the body has been side seamed; and occasionally a collar is misplaced within the can body or entirely omitted.

The object of the present invention is to provide apparatus for detecting the cans having misplaced or missing collars as they pass in procession through the apparatus, and for subsequently ejecting the imperfect cans from the procession of discharged cans at a predetermined station.

Other objects will appear hereinafter.

The invention consists generally in an apparatus comprising a detector turret to which the cans to be tested are fed and from which they are discharged in regular procession, said detector turret including a series of detector units which are actuated to successively engage the successive cans as they pass through said turret, a delayed action or memory device controlled by said detector units, and an air-blaster controlled by the memory device for ejecting a defective can from the procession at a predetermined station after leaving the detector turret.

Each detector unit preferably comprises a body portion or housing and a plurality of depending gage fingers which enter the upper portion of a can and are adapted to engage the upper edge of the collar of the can, if present. Each finger is yieldingly held downwardly and is adapted to actuate a pair of switches for controlling a circuit to the memory device. One of said pair of switches is normally closed and the other switch normally held open. When the detector unit is lowered and the gage fingers engage a properly positioned collar, further downward movement of the finger is arrested, and as the unit continues to the end of its downward travel the interception of the finger will permit closing of the normally open switch thereby completing the circuit to a memory device.

The memory device includes a rotary member which rotates in timed relation with the detector turret, and is provided with a series of projectable elements each of which, when projected, is adapted at a predetermined time thereafter to effect the closing of a switch in a circuit to an air-blaster, for ejecting a defective can from the procession of discharged cans. Said projectable elements are actuated by a spring impelled member which is normally held retracted by a solenoid, so that upon breaking the circuit to said solenoid, the projectable element then in alignment with said spring impelled element will be moved to operative position. Interposed in the circuit of said solenoid is a switch normally held closed by a second solenoid, which latter solenoid is in the circuit to the switches in the detector units, whereby when any one of the switches in a lowered detector unit is open, during the testing period, the circuit to the memory device is broken thereby permitting the spring impelled member to move one of said projectable elements into position to close the switch in the circuit to the air blaster. However, if the circuit is not broken, as is the case when a perfect can is tested, the memory device will not function to eject the can.

The invention further includes means for closing the circuit between the detector units and the memory device during the testing periods only.

With the above and other objects in view that will hereinafter appear, the nature of the invention will be more clearly understood by reference to the following detailed description, the appended claims and the several views illustrated in the accompanying drawings.

In the drawings:

Figure 1 is a side elevation of a detecting and ejecting apparatus embodying the invention;

Figure 2 is a diagrammatic plan view of the device with the upper portion of the detector turret omitted;

Figure 3 is a detail plan view of the detector turret, illustrated upon an enlarged scale, portions being omitted, and parts being shown in section;

Figure 4 is a diagrammatic vertical section of the detector turret;

Figure 5 is a detail vertical section of one of the detector units, illustrated upon an enlarged scale;

Figure 6 is a section on the line 6—6 of Figure 5;

Figure 7 is a side elevation of the memory device upon an enlarged scale;

Figure 8 is an end elevation thereof;

Figure 8A is a detail of the switch operating means for closing the circuit between the detector unit and the memory device, a portion of the supporting bracket being broken away;

Figure 9 is a general diagram of the electric circuit of the device, including two detector units, one unit being illustrated in lowered or operating position, and the other unit being in raised position;

Figure 10 is a detail diagram of the circuit as embodied in each detector unit, and the connection of the same to the general circuit; and Figure 11 is a diagram of the driving mechanism of the device.

Referring to the drawings, 10 indicates the body or frame structure of the apparatus which is supported as upon legs 11, and includes a feed extension 12 and a discharge extension 13; said body and extensions having a plane surface or table top 14 over which the cans to be tested are moved as will appear hereinafter. Supported above the top 14 of the frame is a feed turret A, a detector turret B, and a discharge turret C.

The detector turret B is mounted upon a vertical shaft 16, and includes a circular plate 17, the upper surface of which is in the plane of the top surface 14 to receive and support the can bodies as they pass through the turret, a star-wheel 18 above said plate provided in its periphery with a series of substantially semi-cylindrical recesses 18' for receiving and advancing the cans, and a substantially cylindrical detector head 19, the latter supporting a series of vertically reciprocatory detector units 20, coaxial with the recesses 18', and which are lowered successively into operative relation with successive cans as they are fed through said turret. The lower end of shaft 16 is rotatably mounted in bearings 21 arranged below the top 14; and the upper portion of the shaft is provided with bearings 22 in a fixedly supported cam block 23 which is secured as at 24 to a supporting arm 25 mounted upon a vertical holding post 26 extending upwardly from the frame body 10.

A motor 28 is provided for driving the turrets A, B and C, together with the means for feeding the cans to the turrets and discharging the same therefrom. The motor is preferably arranged below the frame 10, as illustrated in Figures 1 and 2, and upon the shaft 29 thereof is fixed a belt pulley 30 connected by belts 31 to a machine drive pulley 32 fixed to a horizontal stub shaft 33. On the inner end of shaft 33 is a bevel gear 34 meshing with a larger bevel gear 35 on a vertical stub shaft 36. Upon the lower end of the vertical shaft 36 is fixed a reverse gear 37 which meshes with a feed turret drive gear 38 fixed to the lower end of the feed turret shaft 39. Also fixed to the shaft 39 is a pinion 40 which meshes with a gear 41 on the shaft 16 of the detector turret B; and the gear 41 meshes with a similar gear 42 on the vertical shaft 43 of the discharge turret C. The pitch circles of gears 37, 38, 40, 41 and 42 are indicated in the diagrammatic Figure 2 of the drawings; and the directions of rotation of said gears are indicated by arrows.

The upper end of the stub shaft 36 is provided with a bevel gear 45 which meshes with a bevel gear 46 on a horizontal cross shaft 47. Fixed to the shaft 47 adjacent one end thereof is a sprocket 48 for driving a feed chain 49; and a similar sprocket 50 is fixed adjacent the opposite end of the shaft for a discharge chain 51.

Cans $x$ indicated by dotted lines in diagrammatic Figure 2 are advanced by the feed chain 49 to the feed turret A, which delivers the cans to the detector turret B, which in turn delivers the cans to the discharge turret C. Guide rails 53 are provided to maintain the cans in proper position as they are advanced through the apparatus.

The detector head 19 comprises generally a cylindrical outer wall 55 and a transverse web 56, and an axial sleeve 57 extending downwardly from said web. The lower end of said sleeve 57 rests upon and is keyed, as at 58, to the star wheel 18, which wheel is keyed as at 59 to the rotary circular plate 17. See Figure 4. The lower portion of the cam block 23 is arranged within the detector head 19 above the web 56, and is formed with a peripheral cam groove 60. Fixed to the cam block 23 and above the level of the upper edge 19' of the detector head 19, is a pair of superposed collector rings 61 and 62 which are insulated from each other and from the block 23 by insulating posts 63. The collector rings 61 and 62 are connected by conductors 61' and 62' to a low voltage line 64. See Figures 9 and 10.

Each detector unit 20 consists broadly in a vertically reciprocatory supporting rod 66, a gage finger 67 carried by said rod and yieldingly projected downwardly therefrom to enter into the open end of the can to be tested and to yieldingly engage the upper edge X' of the collar X therein when the unit is lowered, a pair of superposed switches 68 and 69 supported by said rod 66 adjacent said finger, and an arm 70 on said finger extending between said switches to control the same. Said arm 70 is so positioned with relation to the switches 68 and 69 as to normally permit the upper switch 68 to remain closed, and to maintain the lower switch open when the detector unit is raised, as illustrated at the right hand unit 20 in Figure 9; and to permit both of said switches to be closed when the unit is lowered and the finger engages a properly positioned collar, as shown at the left hand unit 20 in the same figure. The switches 68 and 69 are connected to the collector rings 61 and 62 respectively by conductors 71 and 72 of a flexible cable 73, and brushes 71' and 72'. When both switches, 68 and 69, are closed a circuit is established therethrough to the low voltage line 64; but should either of said switches be opened, as would be caused by a misplaced or missing collar, the circuit would be broken, thereby resulting in the operation of the memory device and ejector, as will appear hereinafter.

Should the misplacement of the collar be only a matter of distance from the upper edge of the can, one gage finger 67 in each detector unit 20 would suffice; but as the collars are sometimes cocked, one side being higher than the opposite side, the defect would not be detected should the finger happen to engage the cocked collar at a point which is at the proper distance from the upper edge, as indicated at Y in Figure 10. In said Figure 10, the dotted line $y$ indicates the proper level of the upper edge of the collar. It is therefore preferable to provide each detector unit 20 with a plurality of similar fingers to engage the collar at several points on its upper edge. Three such fingers arranged at substantially 120° apart are ample. By this arrangement at least one of the fingers will detect any misplacement of a collar and break the low voltage circuit, thereby resulting in the subsequent ejection of the defective can.

In the preferred form of the detector unit 20, said unit comprises a housing preferably consisting of upper and lower plates 74 and 75 respectively, connected by a centered sleeve 76, and a preferably cylindrical outer wall 77 which may be of sheet material and readily removable to give access to the interior of the unit. Extending upwardly from each detector unit 20 is the vertically disposed supporting rod 66, above mentioned, the lower end 66' of which is preferably fixed within the sleeve 76, as illustrated in Figure 5. Each rod 66 is mounted for vertical reciprocation in a sleeve 79 on the detector head 19; and fixed to the upper portion of said rod 66 is a bracket 80 upon which is mounted a roller 81 that travels in the cam groove 60 to lower and raise the detector unit 20. The bottom plate 75 of the detector unit is preferably provided with a depending cylindrical flange 82 to receive the upper end of a can when said unit is lowered; and the lower edge of said flange is inwardly bevelled as at 82' to assure proper positioning of the can with relation to the detector unit without injury to the upper edge of the can. As above stated, three vertically disposed gage fingers 67 are provided in each detector unit 20, the lower ends thereof yieldingly projected below the bottom of plate 75 and adapted to be moved into and out of the upper end of the can being tested as the unit 20 is lowered and raised by cam 60; and a pair of superposed push-button switches 68 and 69, mounted upon a bracket 83 are arranged adjacent each of said gage fingers.

Each gage finger comprises an upper section 84 having a limited vertical movement in bearing apertures 85 and 86 in the upper and lower plates 74 and 75 respectively of the housing 20, and a lower feeler section 87, the upper portion 87' of which is telescopically arranged in a bore 88 in the upper section 84, and with the lower end 89 thereof adapted to enter the cans. The switch actuating arm 70, hereinbefore mentioned, is formed on the upper section 84 of the gage finger and extends between the push buttons 68' and 69' of the switches 68 and 69 for controlling the same. The finger section 84 extends above the upper plate 74 and is provided with a collar 90 threaded thereon to limit the downward movement of said section; and a lug 91 projecting laterally from said section 84, and engageable with a stop member 92 adjustably mounted in an overhanging bracket 93, limits the upward movement thereof to prevent damage to the switch 68 due to over travel. The bracket 93 is provided with parallel guide walls 95 between which the lug 91 moves, which also prevents rotation of the gage fingers 67 and maintains the arm 70 between the push buttons 68' and 69'.

The lower or feeler section of the gage finger is provided with a stem 94 extending axially through the upper section 84, and a pair of adjusting nuts 96 are threaded upon the projecting upper end thereof. A spring 97 interposed between the upper end of bore 88 and the feeler section 87 yieldingly holds said feeler section projected downwardly, the nuts 96 limiting the downward movement thereof. The section 87 is also provided with a lug 98 extending laterally into a longitudinally disposed slot 99 in the lower end of the upper section 84, which limits the upward movement of the feeler section 87 relative to the upper section.

The lug 91 and arm 70 are preferably opposite on the section 84 of the finger and together constitute an abutment for a compression spring 101 interposed between the same and the upper plate 74.

The finger elements above described are carefully adjusted so that the upper switches will remain closed and the lower switches 68 held open when the detector unit is in raised position; and it should be understood that only a slight movement of a gage finger with relation to the switches will be sufficient to make or break the circuit therethrough, so that the device will be sensitive to the slightest variation of any portion of the upper edge of a collar from the normal correct position.

As hereinbefore stated, the gage fingers are preferably spaced approximately 120 degrees apart; and are spaced radially from the axis of the unit 20 a distance slightly less than the inner radius of the cans to be tested so as to enter the cans freely but sufficiently close to walls thereof to ensure positive engagement of each finger with the upper edge of the collar. Each detector unit is also provided with a plurality of knock-out pins 103, each of which is forced downwardly by a spring 104 to engage the upper edge of the can as the gage fingers enter the can. When the detector unit is raised, after each operation, the pins 103 remain in engagement with the upper edge of the can and hold the can seated on the plate 17 until the fingers are withdrawn from the can, thereby preventing the can from being lifted by the detector unit.

In each detector unit the three upper switches 68 and the three lower switches 69 are connected electrically in a single series across the collar rings 61 and 62, one end of said series being connected by the conductor 71 and brush 71' to one of the collector rings, as 61, and the other end of the series being connected by conductor 72 and brush 72' to the ring 62, as before described, and as illustrated in Figure 10 of the drawings. It is obvious that when all of the switches 68 and 69 in a detector unit are closed, the low voltage circuit 64 is closed; and that when any one of said switches is open, said circuit will be broken.

The detector units 20 above described are designed to control the operation of a delayed action memory device for automatically discarding the imperfect cans as hereinbefore mentioned.

The delayed action memory device is illustrated in detail in Figures 7, 8 and 8A, of the drawings; and the principal elements thereof are indicated in dotted lines in Figures 1 and 2 in order to illustrate the preferred location of the same with relation to the detector mechanism. As the operation of the memory device must be synchronized with the operation of the several detector units, the former is preferably located so as to be operatively connected to the horizontal cross shaft 47 with which the turrets A, B and C, and the feed and discharge chains 49 and 51 are actuated. To this end the shaft 105 of the memory device is arranged with its axis below and parallel with the axis of shaft 47 and is connected thereto, as will be presently described. The shaft 105 is mounted in bearings 106 and 107 on bearing brackets 108 and 109, respectively, extending upwardly from a supporting base 110. One end of shaft 105 extends beneath the discharge chain end of shaft 47, as illustrated in Figures 2 and 11, and is provided with a sprocket 111 which is connected by a chain 112 to a sprocket 113 on shaft 47. An idler wheel 114 is adjustably mounted on the upper end of bracket 108 to take up slack in chain 112.

Fixed to the opposite end of shaft 105 from the sprocket 111, and spaced from the bracket 109, is a turret comprising a disk 115 and a plurality of longitudinally shiftable pins 116 extending transversely therethrough. Said pins which are of greater length than the thickness of said disk are yieldingly held in either of two positions by a detent, such as a spring pressed ball 117, which engages in either of two peripheral grooves 118 or 119 in the pins. The pins 116 are adapted, when in one of the alternative positions, to effect the closing of a circuit 120 to an air-blaster 121 having a discharge nozzle 121' arranged in position for ejecting an imperfect can from the procession of cans being delivered along the discharge portion 13 of the apparatus, as illustrated in Figure 2; and adjustable means are provided for timing the closing of said circuit with relation to the operation of the detector hereinbefore described. To this end a plate 122 is arranged for angular adjustment about the shaft 105, and is provided with arcuate slots 123 and 124 to receive bolts 125 and 126 respectively for clamping the plate 122 in adjusted position to the bracket 109. Mounted on said plate 122 is a normally open push-button switch 127 arranged in the air blaster circuit 120, and also a bell-crank lever 128 for actuating the switch. Said lever comprises an arm 129 having an adjustable member 130 thereon engaging the push button 131 of switch 127, and a cam arm 132 which lies in the path of the end portion 116' of a pin 116 when projected outwardly beyond the adjacent side of the disk 115. A tension spring 133 between a stud 122' on plate 122 and the arm 129 of lever 128, yieldingly holds the cam arm 132 in position to be actuated by a projected pin 116; and an adjustable stop member 134 is provided to limit the swing of said lever. It is obvious that by adjusting the plate 122 with the switch 127 and lever 129 thereon, the actuation of said switch to close the circuit to the air blaster 120 may be advanced or retarded to accurately time the operation of said air-blaster; and that by adjustment of the switch button contact member 130 on arm 129, and of the stop member 134, the cam arm 132 of the lever 128 may be accurately positioned with relation to the orbit of the pin 116, after the plate 122 has been adjusted. The pins 116 are normally held in retracted position by the detents 117 so that the switch actuating ends 116' thereof will not engage the cam arm 132 as the disk turret rotates unless a pin has been projected consequent to the operation of the detector.

To project a pin into operative position, a spring impelled member 135 is provided, said member being normally held in retracted position by a solenoid 136 in a shunt circuit 137 across the normally open air blaster circuit 120. See Figures 9 and 10. Said spring impelled member 135 preferably comprises an arm 138 of a bell crank lever 139 which is pivoted as at 140 on a suitable support 141. The other arm 142 of said lever 139 is connected by a link 143 to the armature 144 of the solenoid 136.

When the solenoid 136 is energized, the arm 139 is held in retracted position against the tension of a spring 145, as shown in full lines in Figure 7; but when said solenoid is deenergized, the arm 138 is quickly moved by said spring to kick the pin 116 then opposite the same, into operative position, as indicated in dotted lines in said figure. An adjustable stop 146 is provided to limit the throw of the arm 138; and a threaded anchor member 145' for the spring 145 provides means for adjusting the tension thereof.

A spring retractable relay switch 147 is interposed in the shunt circuit 137, and is held in closed position by the solenoid 148 in the low voltage line 64 of the detector circuit. When the circuit to the solenoid 148 is broken the spring 149 of the relay switch 147 opens said switch and breaks the circuit to the solenoid 136 thereby releasing the member 135, which operates to project the pin 116 which at that time is opposite said member 135 into position to actuate the cam arm 132 and close the switch 127 after said pin has completed the major portion of its revolution subsequent to being shifted. The time delay between the shifting of a pin 116, as above described, and the time the pin engages and actuates the arm 132 to close the switch 127, is equal to the time necessary for a can to pass from the detecting station T (Figure 2) to the ejecting station E, which latter station is in operable range of the air blaster nozzle 121'.

A buffer block 150 is fixed to bracket 109 directly opposite the spring impelled member 135, and limits the throw of the pin 116 when kicked into operative position by said member. The block 150 also supports a cam 151 which extends into the path of the projected end 116' of a pin 116, to restore the pin to normal retracted position in the disk turret 115 before reaching the position where it may be again acted upon by the impelling member 135.

As hereinbefore stated, the rotary detector turret B is equipped with a plurality of detector units 20, preferably four, which are lowered successively by the cam 60 to engage successive cans as they pass through said turret B. Each detector unit preferably begins to drop as soon as a can is entered below the same into the turret, as indicated at D' in Figure 2, and reaches the lowest position at D², at which low position it dwells until reaching the position D³, after which the unit rises until it reaches maximum height at D⁴ which is approximately where it is removed from the turret B by the discharge turret C. The testing period occupies the major portion of the "low dwell" as indicated in Figure 2.

During the intervals between successive tests, the circuit through all of the several detector units is broken; therefore it is necessary to provide means for maintaining the circuit to the solenoid 148 of the relay switch 147 unbroken during such intervals. To this end a normally closed holding switch 154 is provided in a circuit 155 parallel with the detector circuit 71—72, which switch is opened only during a testing period after the switches 68 and 69 of the lowered detector unit have been set according to the position of a collar in the can being tested, as hereinbefore described. The switch 154 is actuated by a cam disk 156 mounted on the shaft 105 of the memory device, said disk being provided with a plurality of peripheral cams 157 which successively engage and operate a lever 158 to open the switch 154. The lever 158 is pivotally mounted, as at 159 on a bracket 160 supported in the base 110, and comprises an arm 161 having a roller 162 engaging the periphery of the cam disk 156, and an arm 163 having an adjustable member 164 engaging the push button 154' of switch 154, said switch being also mounted on the bracket 160 as illustrated in Figure 8A. A spring 165 between the arm 163 and a stud 166 on the bracket 160 maintains the roller 162 in contact with the cam disk 156.

When a detector unit 20 is lowered by the cam 60, the lower ends of the feeler sections 87 of the gage fingers 67 enter the open upper end of the cam and engage the upper edge X' of the collar X, if a collar is present. If a collar is present, and in proper position within the can, the downward movement of the gage fingers 67 and the switch controlling arm 70 thereon is arrested and further downward movement will carry the lower switch 69 and switch button 69' thereof downwardly beyond the arrested arm 70, thereby permitting the lower switches 69 to close. In this intermediate position of the fingers 67, and the arms 70 thereon, relative to the body of the unit, all switches 68 and 69 of the unit are closed. As the upper switches 68 remain closed, the closing of switches 69 connects the series of switches 68—69 to the collector rings 61 and 62, and thence to the solenoid 148 of the relay switch 147. As the units reach the testing period, which is after the switches 68 and 69 have been set, one of the cams 157 on cam disk 156 opens the switch 154 thereby transferring the control of the relay switch 147 to the detector unit switches. If a collar is present and in proper position in the can, in which case all switches 68 and 69 are closed, the current to the relay solenoid 148 remains unbroken and the memory device and ejecting means are not effected. The can x therefore passes through and is discharged from the apparatus in regular order.

Should a test finger be arrested before reaching the normal level of a correctly positioned collar, as in the case where a collar or a portion thereof, is too high, as indicated at Y' in Figure 10, the arms 70 on the fingers 67 will effect the opening of one or more of the upper switches 68 in detector unit 20, so that when the holding switch is opened for the test, the circuit to the solenoid 148 is broken and the relay switch 147 opens and breaks the circuit to solenoid 136 thereby setting the memory device into operation, as hereinbefore described.

Should the collar, or a portion thereof be too low, or should the collar be entirely missing, one or more of the lower switches 69 will fail to close, thereby causing a break in the circuit to solenoid 148 when the switch 154 is opened, which will result in ejection of the can when the same reaches the ejection station E.

While one form of the invention has been shown for purposes of illustration, it is to be clearly understood that various changes in the details of construction and arrangement of parts may be made without departing from the spirit and scope of the invention as defined in the appended claims.

We claim:

1. In an apparatus for testing can bodies for misplaced or absent collars, a testing station, means for feeding can bodies through said station in regular procession, a detector unit comprising a vertically movable support, a gage finger carried by said support and having limited vertical movement therein, the lower end of said finger extending below said support and adapted to be moved into and out of a can body to be tested to engage a collar therein, means for yieldingly holding said finger in lowermost position relative to said support, a normally closed switch and a normally open switch on said support adjacent said finger, an arm on said finger extending between said switches and adapted to control the opening and closing of the same according to the relative movement of said finger in said support, and means for lowering said detector unit into operative relation to the can at the testing station in combination with electrically actuated means controlled by said relative movements of said switch controlling arm and said support for ejecting a defective can from said procession at a predetermined position after leaving said testing station.

2. In an apparatus for testing can bodies for misplaced or absent collars, a testing station, means for feeding can bodies through said station in regular procession, a detector unit and means for lowering said detector unit into operative relation to the can at the testing station, said detector unit comprising a vertically movable support, a gage finger carried by said support and having limited vertical movement therein, the lower end of said finger extending below said support and adapted to be moved into and out of a can body to be tested to engage a collar therein, means for yieldingly holding said finger in lowermost position relative to said support, a pair of superposed switches adjacent said finger, each of said switches including a push button for opening the same, and an arm on said finger extending between said push buttons, and positioned to permit the upper switch to remain closed and to hold the lower switch open when said finger is in lowermost position in said support, and to permit both of said switches to be closed when said finger engages a properly positioned collar, and to open the upper switch when engaging an upwardly misplaced collar, said switches being connected in series, in combination with electrically actuated means for ejecting a defective can from said procession at a predetermined position after leaving said testing station, a normally closed circuit for holding said ejecting means out of operation, a spring retractable relay switch in the last said circuit and including a solenoid in the circuit to said superposed switches in said detector unit, whereby opening of either of said superposed switches will deenergize said solenoid and set said ejecting means into operation.

3. In an apparatus for testing can bodies for misplaced or absent collars, a testing station, means for feeding can bodies through said station in regular procession, a detector unit, means for lowering said unit into operative relation to a can at said testing station, said detector unit comprising a supporting housing, a plurality of gage fingers carried by said housing and having limited independent vertical movement therein, the lower ends of said fingers extending below said support and adapted to be moved into the upper end of a can body to be tested to engage a collar therein at spaced intervals on the upper edge thereof, means for yieldingly holding said fingers in lowermost position relative to said housing, a pair of superposed switches in said housing adjacent each of said fingers, each of said switches including a push-button for opening the same, and an arm on each of said fingers extending between the push-buttons of the pair of switches adjacent thereto, and positioned to permit the upper switch to remain closed and to hold the lower switch open when said finger is in lowermost position in said support, and to permit both of said switches to be closed when said finger engages a properly positioned collar, and to open said upper switch when engaging an upwardly misplaced portion of a collar, all of said switches being connected in series, in combination with electrically actuated means for ejecting a defective can from said procession at a predetermined position after leaving said testing station, a normally closed circuit for holding said ejecting means out of operation, a spring retractible relay switch in the last said circuit, said switch including a solenoid in the circuit to said switches in said detector unit, whereby opening of any one of said detector head switches will deenergize said solenoid and initiate the operation of said ejecting means.

4. In a detecting and ejecting apparatus of the class described, a detecting turret, means for feeding cans to said turret and means for discharging the cans therefrom in regular procession, said turret including a star wheel having a plurality of can receiving recesses in the periphery thereof, and a rotary detector head above said wheel, a plurality of detector units carried by said detector head and in axial alignment with said can receiving recesses, means for lowering the successive detector units successively into operative relation to successive cans passing through said turret, each of said detector units comprising a housing, a plurality of vertical gage fingers having independent limited vertical movement therein, the lower ends of said fingers extending below the bottom of its respective housing and adapted to be moved into the upper end of the can body being tested to engage a collar therein at spaced intervals on the upper edge thereof, each of said fingers being provided with means for yieldingly holding the same in lowermost position relative to said housing, a pair of superposed switches in said housing adjacent each of said fingers, each of said switches including a push-button for opening the same, and an arm on each of said fingers extending between the push-buttons of the pair of switches adjacent thereto, and adapted when all of said fingers are in intermediate position to close the circuit through said switches, and when one or more of said fingers are above or below said intermediate position to open an adjacent switch and thus break the circuit through said detector unit, in combination with electrically actuated means for ejecting a defective can from said procession at a predetermined position after leaving said detector turret and means controlled by the breaking of the circuit through said unit for initiating the operation of said ejecting means.

5. In a detecting and ejecting apparatus of the class described, a detecting turret means for feeding cans to said turret and means for discharging the cans therefrom in regular procession, said turret including a star wheel having a plurality of can receiving recesses in the periphery thereof, and a rotary detector head above said wheel, a plurality of detector units carried by said detector head and in axial alignment with said recesses, each of said units including a housing, a vertically reciprocatory supporting rod for said housing, a sleeve on said detector head for each of said supporting rods, a cam block fixedly supported within the upper portion of said detector head and provided with a peripheral cam groove, a roller mounted upon the upper portion of each of said supporting rods and travelling in said cam groove to lower the successive detector units successively into operative relation to successive cans passing through said turret, each of said detector units being equipped with a plurality of gage fingers having independent limited vertical movement therein, the lower ends of said fingers extending below the respective housings and adapted to be moved into the upper end of the can body to be tested to engage a collar therein at spaced intervals on the upper edge thereof, each of said fingers being provided with means for yieldingly holding the same in lowermost position relative to the housing, a pair of superposed switches in said housing adjacent each of said fingers, a pair of collector rings supported on said cam block and insulated therefrom and from each other, all of said switches of each detector unit being connected in series to said collector rings, a laterally extending arm on each of said fingers adapted to control the adjacent pair of switches whereby when all of said fingers are in intermediate position the circuit to said collector rings is completed, and when one or more of said fingers are above or below intermediate position said circuit will be broken, in combination with means for ejecting a defective can from the procession of tested cans, and means governed by the opening of a switch in a lowered detector unit for setting said ejecting means into operation.

6. In an apparatus for testing can bodies for misplaced or absent collars, a detecting turret having a plurality of can receiving pockets and a detector head supported above said pockets, a plurality of detector units carried by said detector head in axial alignment with said pockets, means for rotating said turret, means for feeding cans to said turret, means for discharging the same from said turret in regular procession, means for lowering successive detector units successively into operative relation to successive cans passing through said turret, each of said detector units comprising a housing, a plurality of vertical gage fingers having independent limited vertical movement therein, the lower ends of said fingers extending below the bottom of their respective housings and adapted to be moved into the upper end of the can being tested to engage a collar therein at spaced intervals on the upper edge thereof, each of said fingers being provided with means for yieldingly holding the same in lowermost position relative to the housing, a pair of superposed switches in said housing adjacent each of said fingers, all of said switches being connected in a single series, each of said switches including a push button for opening the same, and an arm on each of said fingers extending between the push-buttons of the switches adjacent thereto, and adapted when all of said fingers are in intermediate position to close the circuit through all of said switches, and when one or more of said fingers is above or below intermediate position to open an adjacent switch and break the circuit through said unit, in combination with electrically actuated means for ejecting a defective can from the procession of discharged cans, a normally closed relay switch in the circuit to said ejecting means, the solenoid of said relay switch being in the circuit of said detector unit switches, and a cam actuated switch in parallel with said detector unit switches for maintaining the circuit to said relay switch solenoid closed during the intervals between the successive detecting periods, and for opening the same when each detector unit reaches lowermost position.

7. In an apparatus for testing cans for misplaced or absent collars, a detector turret having a plurality of can receiving recesses, a like number of detector units in axial alignment with said recesses, each of said units comprising a support, a plurality of vertical gage fingers having independent limited vertical movement in said support, the lower ends of said fingers extending below said support and adapted to enter a can to engage the upper edge of a collar, a pair of switches adjacent each of said fingers, means in said fingers for controlling the adjacent switches, a pair of collector rings above said turret, all of the switches of each detector unit being connected in series to said rings, means for feeding cans to said turret and for discharging the same therefrom in regular procession, means for lowering said detector units successively into proximity to the upper edge of the successive cans in said turret, in combination with electrically actuated means for ejecting defective cans from said procession, a delayed action memory device for controlling said ejecting means, a relay switch in the circuit to said memory device, and a normally closed holding switch in parallel with said detector unit switches, and means for opening said holding switch after each detector unit has been lowered into operative position and for closing the same prior to the rising of each unit.

8. In a can testing and ejecting apparatus of the class described a detector turret, means for feeding cans to said turret and means for discharging the same therefrom in regular procession, said turret including a plurality of detector units each comprising a vertically reciprocatory housing, a plurality of gage fingers having independent limited vertical movement therein with the lower ends of said fingers extending below said housing and adapted to enter a can to be tested and engage a collar therein at spaced intervals in the upper edge thereof, means for yieldingly holding said fingers in lowermost position relative to said housing, a pair of superposed switches adjacent each of said fingers, an arm on each finger extending between the adjacent switches and adapted when all of said fingers are in intermediate position to close the circuit through all of said switches and when one or more of said fingers is above or below intermediate position to open an adjacent switch and break the circuit through said unit, in combination with an electrically actuated ejector and ejector circuit, a normally open switch in said ejector circuit, closing means for the last said switch, a rotary element synchronized with said detector turret, a plurality of shiftable elements carried by said rotary element, a spring projectable element for moving one of said shiftable elements into position to actuate said switch closing means, a shunt circuit across the ejector circuit, a solenoid in said shunt circuit holding said spring projectable element in retracted position, a spring retractable relay switch in said shunt circuit, a solenoid in said low voltage circuit normally holding said relay switch closed, a normally closed coupler switch shunted across said low voltage circuit between said detector turret and the last said solenoid, a rotary cam synchronized with the vertical reciprocation of said detector units for opening said coupler switch when each of said detector units is lowered to transfer the control of the ejector circuit to the detector unit.

9. In an apparatus for testing can bodies for misplaced or absent collars, a testing turret comprising a vertical shaft, a circular can supporting plate, a star wheel above said plate and provided with a plurality of can receiving recesses in the periphery thereof, a detector head comprising a substantially cylindrical outer wall, a transverse web and a downwardly extending supporting sleeve keyed to said star wheel, a plurality of detector units in axial alignment with said recesses respectively, a vertical supporting rod for each of said detector units, bearings on said detector head for said rods, a fixedly supported cam block arranged within said detector head above said web and having a peripheral cam groove, a roller on each of said supporting rods and travelling in said cam groove, whereby said detector units are successively lowered to engage successive cans in said turret as said turret rotates, a pair of collector rings mounted upon said cam block and insulated therefrom and from each other, a plurality of gage fingers extending downwardly from each of said detector units, means for yieldingly holding said fingers in lowermost position relative to said unit, switches actuated by said fingers when said unit is lowered into testing position, a pair of brushes on said detector head above each of said detector units and engaging said collector rings respectively, and flexible cables connecting the switches in said units to said brushes respectively; in combination with means for delivering the tested cans from said turret in regular procession, delayed action means for ejecting imperfect cans from said procession, and means electrically connected to said collector rings for initiating the operation of said ejecting means.

10. In an apparatus for testing can bodies for misplaced or absent collars, a suitably supported frame body having a plane top surface over which the cans are shifted, a feed turret, a detector turret and a discharge turret mounted above said surface, each of said turrets including a vertically disposed shaft, a motor driven shaft, a vertical stub shaft geared to said motor shaft, a gear fixed to said vertical stub shaft, a train of gears connecting said gear with said turret shafts, a horizontal cross-shaft, bevel gearing connecting said cross shaft to said stub shaft, a feed chain for delivering cans to said feed turret, a second feed chain for delivering the tested cans in regular procession from said discharge turret, sprockets on said cross shaft for driving said chains, means on said detector turret for testing the cans, means for ejecting defective cans from said procession of discharged cans, a delayed action device for controlling the operation of said ejecting device, a drive shaft for said delayed action device, and sprocket gearing connecting the last said shaft with said horizontal cross shaft to synchronize the operation of the delayed action shaft and said testing means.

11. In an apparatus for testing can bodies for misplaced or absent collars, a detecting turret having a plurality of can receiving pockets and a like number of detector units supported above said pockets respectively and in axial alignment therewith, a low voltage detector circuit for said units, means for rotating said turret, means for feeding cans to said turret, means for discharging the cans therefrom in regular procession, means for lowering successive detector units successively into operative relation to successive cans passing through said turret, each of said detector units including a support, a plurality of vertically disposed gage fingers having independent vertical movement relative to said support, the lower ends of said fingers adapted to be moved into the upper end of the can to be tested to engage a collar therein at spaced intervals on the upper edge thereof, means for yieldingly holding said fingers in lowermost position in said support, a pair of switches on said support adjacent each of said fingers, all of said switches of each detector unit being connected in a single series to said detector circuit, and means on said fingers to control said switches whereby when all of said fingers are in intermediate position the circuit through all of said switches of the unit will be closed, and when one or more of said fingers is above or below intermediate position, one or more of the switches adjacent thereto will be open to break the circuit through said detector circuit, an air-blaster for ejecting a defective can from said procession of discharged cans, a circuit to said air blaster, a normally open switch in said air-blaster circuit, a power driven shaft for operating said can feeding and discharging means, a second shaft geared to said power driven shaft, a disk on said second shaft, a plurality of shiftable pins extending transversely therethrough and adapted when in shifted position to effect the closing of the last said switch, a spring impelled member for shifting one of said pins into switch closing position when said detector circuit is broken, a shunt circuit in said air-blaster circuit, a solenoid in said shunt circuit for holding said spring impelled member in retracted position, a switch in said shunt circuit, a solenoid in said low voltage detector circuit for maintaining said switch closed, a circuit in parallel with said detector unit switches, a normally closed holding switch in the last said circuit, a cam disk on said second shaft, and cams on said disk timed to open said holding switch while a detector unit is in lowest position.

12. A device as set forth in claim 11, in combination with means for advancing or retarding the operation of said spring impelled member, to time the operation of said air-blaster.

13. A device as set forth in claim 11, in combination with a cam arranged in the path of a shifted pin to return the pin to normal retracted position.

14. In a can testing apparatus of the type described, a detector unit adapted to be lowered into operative relation to a can to be tested, said detector unit comprising a housing, a plurality of gage fingers having individual limited vertical movement relative to said housing, the lower ends of said fingers projecting below said housing to enter a can to be tested and engage the upper edge of a collar therein, a pair of superposed switches adjacent each of said fingers, an arm on each of said fingers extending between the adjacent switches to control the same, a lug extending from the opposite side of said fingers from said arm, a bracket having vertical guide walls for said lug and an adjustable stop on said bracket to limit the upward movement of said finger, and a spring interposed between the top of said housing and said arm and lug for yieldingly holding said finger in lowermost position.

15. In a can testing apparatus of the type described, a detector unit adapted to be lowered into operative relation to a can to be tested, said detector unit comprising a housing, a plurality of gage fingers each having limited vertical movement relative to said housing, the lower ends of said fingers projecting below said housing to enter a can to be tested, a pair of superposed switches adjacent each of said fingers, each of said switches including a push-button, and an arm on each finger extending between the push-buttons of the adjacent switches to control the same, a spring yieldingly holding said finger in lowermost position in the housing, a collar on the upper end of said finger to limit the downward movement thereof, and an adjustable stop member to limit the upward movement thereof.

No references cited.